Patented July 17, 1951

2,561,178

UNITED STATES PATENT OFFICE 2,561,178

ORGANOPOLYSILOXANES

Charles A. Burkhard, Schenectady, N. Y., assignor to General Electric Company, a corporation of New York No Drawing. Application July 28, 1949,
Serial No. 107,391

10 Claims. (Cl. 252—49.6)

1

This application is a continuation-in-part of my earlier copending application Serial No. 676,-852 (now abandoned), filed June 14, 1946, and assigned to the same assignee as the present invention.

This invention is concerned with organo-substituted polysiloxanes having incorporated therein certain additives for improving the lubricity of the organopolysiloxanes. More particularly, the invention relates to liquid organopolysiloxanes containing additives which comprise chemical compounds corresponding to the general formula

where R is a saturated aliphatic radical containing from 1 to 4 carbon atoms (e. g., methyl, ethyl, propyl, isopropyl, butyl, isobutyl, etc.), X is a halogen, e. g., chlorine, bromine, fluorine, etc., and $n$ is an integer equal to from 1 to 2. Preferably X is in the paraposition, although the positions where X is ortho or meta are not precluded. One of the more simple compounds covered by the above-identified general formula is the compound

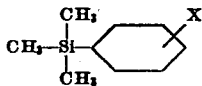

where X has the meaning given above.

The chemical compounds embraced by the above formula have various uses including their use as intermediates in the preparation of other silicon-containing compounds. The fact that the halogen present on the benzene ring is a reactive halogen causes compounds of the above formula to have especial significance in the case where it is desired to introduce a benzene ring between, e. g., two silicon atoms. Moreover, these compounds have utility as additives to various organopolysiloxanes, as for instance, to dimethyl silicones (oils) which are to be employed as extreme pressure lubricants, to cause wetting of the parts to be lubricated. Because of the polarity of these compounds and because of the number of alkyl groups, e. g., methyl groups, they are compatible with and highly desirable as additives for many organic silicones, for instance, dimethyl silicone oils.

Various methods may be employed in preparing the compounds used as additives in this invention. One method which may be used to prepare compounds corresponding to the general formula

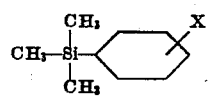

where X has the meaning given above, comprises effecting reaction between a trimethyl halogenosilane and a compound corresponding to the general formula

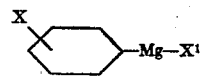

where X and $X^1$ are halogen atoms, and $X^1$ is preferably bromine or iodine. The reaction between the ingredients is more desirably effected in an anhydrous ether (e. g., diethyl ether) medium and at the reflux temperature of the mixture of ingredients. Lower or higher temperatures may also be employed, e. g., the reaction may be effected at room temperature or at temperatures above the reflux temperature of the mass. In the latter case, it will ordinarily be necessary to employ superatmospheric pressures. The reaction mass may then be fractionally distilled to isolate the desired product.

The Grignard reagents generally employed for the reaction with the trimethyl halogenosilane may be prepared, e. g., by effecting reaction in an anhydrous diethyl ether medium between magnesium and a compound of the general formula

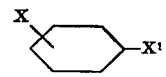

where X and $X^1$ are both halogen atoms, and $X^1$ is preferably bromine or iodine. The trimethyl halogenosilanes used in the preparation of the additive compounds are prepared, for instance, according to the method disclosed and claimed in Rochow and Patnode Patent 2,380,-996, issued August 7, 1945, and assigned to the same assignee as the present invention.

In order that those skilled in the art may better understand how the compounds used as additives in the instant claimed invention may be prepared, the following examples giving methods for preparing these compounds are given by way of illustration. All parts are by weight.

EXAMPLE 1

Para-chlorophenyl magnesium bromide was prepared by effecting reaction between 382 parts para-chlorobromobenzene and 50 parts magnesium turnings in about 800 parts anhydrous diethyl ether. To this reaction mixture was added dropwise with stirring about 220 parts trimethyl-chlorosilane. The reaction mixture was then heated at its reflux temperature for about 8 hours. At the end of this time, the material was fractionally distilled to isolate trimethyl-p-chlorophenylsilane in about an 83 per cent yield based on the weight of the trimethyl-chlorosilane. This compound was analyzed and found to contain about 19.3 per cent chlorine (theoretical 19.20 per cent) and had the following properties:

Boiling point, 119–120° C. at 50 mm.
Density, $d_4^{20}$ 1.0282
Refractive index, $n_D^{20}$ 1.5128

EXAMPLE 2

Para-bromophenyl magnesium bromide was prepared by effecting reaction between 177 parts para-dibromobenzene and 18.8 parts magnesium turnings in about 214 parts anhydrous diethyl ether. To this solution was added with stirring about 81 parts trimethylchlorosilane and the mixture was heated at the reflux temperature of the mass for about six hours. At the end of this time, the mixture was fractionally distilled to isolate trimethyl-p-bromophenylsilane in about a 53 per cent yield based on the amount of the trimethylchlorosilane. Analysis of the compound showed that it contained 34.2 per cent bromine (theoretical 34.87 per cent). The physical properties of the compound were found to be as follows:

Boiling point, 146–148° C. at 50 mm.
Density, $d_4^{20}$ 1.2197
Refractive index, $n_D^{20}$ 1.5302

The other trimethyl para-halogenophenylsilanes, e. g., trimethyl para-fluorophenylsilane, may be prepared in the same manner as was used for the preparation of the chloro- and bromo-substituted derivatives. Other methods, in addition to the ones disclosed in the foregoing examples, may be employed in the preparation of the claimed compounds. One of these methods comprises, e. g., effecting reaction between a halogenobenzene and lithium in anhydrous diethyl ether, and thereafter effecting reaction between the resulting solution and a trimethyl halogenosilane, e. g., trimethylchlorosilane, or a trimethyl alkoxysilane, e. g., trimethyl ethoxysilane.

EXAMPLE 3

Dimethyl bis-(p-chlorophenylsilane) was prepared as follows: p-Chlorophenyl magnesium bromide was prepared by the reaction of 383 grams (2 mols) of para-chlorobromobenzene and 48 grams (2 mols) magnesium turnings in 1500 ml. of anhydrous ethyl ether. When this preparation was completed 129 grams (1 mol) dimethyldichlorosilane in 500 ml. of anhydrous ethyl ether was added and the reaction mixture was heated at reflux for several hours. Distillation of the reaction mixture gave 210 grams (75 per cent yield of dimethyl-bis-(p-chlorophenyl) silane boiling at 191° C. (7 mm.) This crystalline (i. e., at room temperature) product when recrystallized from warm ethanol had a melting point of 45° C. Analysis of this compound showed it to contain 25.7 per cent chlorine (calculated 25.22 per cent chlorine).

The following examples illustrate the effect of using the various compounds corresponding to the general formula described above as additives for liquid organopolysiloxanes.

EXAMPLE 4

A liquid oily methyl polysiloxane constituting essentially recurring structural dimethylsiloxane units and having terminal trimethylsiloxy units was prepared in accordance with the method disclosed and claimed in Patnode Patent 2,469,890, issued May 10, 1949, and assigned to the same assignee as the present invention. The oil thus formed had a viscosity of about 300 centistokes. To samples of the aforementioned methyl silicone oil were added varying amounts of different additives embraced by the general formula found in column 1. The mixture of the methyl silicone oil and additive in each case was tested for lubricity properties on a machine identified as a Precision Shell Four Ball Wear Tester. This machine consists of four 0.5-inch diameter ball bearings, three of which are held in a rigid position in a cup in contact with each other and a fourth rotating ball which is pressed against the three stationary balls by an adjustable force. The rubbing surfaces of the ball bearings are lubricated by the test fluid surrounding the three balls and covering the friction surfaces between the rotating and stationary members. The contact points between the four balls grow to circular, flat scars as wear progresses. The average diameter of these scars in millimeters, after an hour's run at 600 R. P. M. and some particular loading, has been taken as the measurement of wear. The machine is equipped for control of rotational speed, the control and measurement of bulk oil temperature, and the measurement of the coefficient of friction throughout the run. Vertical loads varying from 0.1 to 50 kilograms may be applied to the rotating ball. In these tests, the rotating ball was steel, and the fixed balls either steel or brass.

The following are the results of tests conducted by the aforementioned lubricity tester where the fixed balls were either steel or brass. In each case approximately 3 per cent, by weight, of the additive based on the weight of the methyl silicone oil was added to the latter.

Table 1
STEEL-ON-STEEL
[600 R. P. M., 1 hr., room temp.]

| Additive | Load | Wearscar |
|---|---|---|
| | Kg. | Min. |
| None | 10 | 0.49 |
| para-chlorophenyltrimethylsilane | 10 | 0.28 |
| | 15 | 0.33 |
| | 20 | 0.38 |
| para-bromophenyltrimethylsilane | 10 | 0.30 |
| | 15 | 0.33 |
| | 20 | 0.34 |
| bis-p-chlorophenyldimethylsilane | 10 | 0.31 |
| | 15 | 0.31 |
| | 20 | 0.37 |

Table 2
STEEL-ON-BRASS
[600 R. P. M., 1 hr., room temp.]

| Additive | Load | Wearscar |
|---|---|---|
| | Kg. | Min. |
| None | 10 | 2.33 |
| p-chlorophenyltrimethylsilane | 10 | 0.60 |
| p-bromophenyltrimethylsilane | 10 | 0.49 |
| | 15 | 0.58 |
| | 20 | 0.61 |
| bis-p-chlorophenyldimethylsilane | 10 | 0.52 |
| | 15 | 0.61 |

It will be apparent from the foregoing results that the use of additives of the class described previously improves the lubricity of the liquid methyl polysiloxane markedly as evidenced by the substantial decrease in the wear scar of the bearings lubricated with the particular lubricating composition. Other halogenophenylalkylsilanes corresponding to the aforementioned general formulas may also be used in place of the one described above without departing from the scope of the invention. Thus, in place of the methyl groups in the aforementioned halogenophenylalkylsilanes, one may use with equal success similar compounds in which the alkyl group is either ethyl, or propyl, or isopropyl, or butyl, etc. Silanes containing mixed alkyl groups, for example, p-chlorophenyldimethylethylsilane having the formula

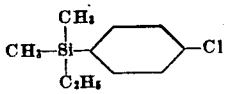

may also be used. The amount of additive employed may be varied from about 0.5 to 10 per cent, preferably from 1 to 5 per cent, by weight, based on the weight of the liquid organopolysiloxane. Generally, it is preferred that the additive be present in a minor proportion with the liquid organopolysiloxane being present in a major proportion.

It is to be understood that other liquid organo-substituted polysiloxanes may be employed in place of the liquid methyl polysiloxane (methyl silicone oil) used in the foregoing examples. These liquid organo-substituted polysiloxanes which comprise essentially silicon atoms connected to one another by oxygen atoms in the form of a siloxane structure wherein a preponderant number of the valences of the silicon atoms are satisfied by the substitution thereon of organic radicals, may be prepared, for example, by the hydrolysis of hydrolyzable organo-substituted silanes, e. g., dihydrocarbon-substituted dihalogenosilanes, for instance, dimethyldichlorosilane, followed by complete or partial condensation of the hydrolysis product. Further examples of liquid organopolysiloxanes which may be employed in the practice of the instant claimed invention and whose lubricity may be improved in accordance with my discovery may be found, for instance, in Patnode Patent 2,469,888, issued May 10, 1949, and Elliott Patent 2,445,567, issued July 20, 1948, both of the foregoing two patents being assigned to the same assignee as the present invention. In addition to chain-stoppered organopolysiloxanes, i. e., organopolysiloxanes containing terminal triorganosiloxy units, other liquid organopolysiloxanes, for example, various cyclic organopolysiloxanes having a ratio of about 2.0 organic groups per silicon atom may also have their lubricity properties improved by the addition of the aforementioned additives.

Other materials may be added to my claimed composition to impart thereto additional desirable properties. Thus, one may incorporate stabilizers against gelation as is more particularly disclosed and claimed in the aforementioned Elliott patent. In addition, corrosion inhibitors, anti-oxidants, etc., may also be added to further improve the properties of the liquid organopolysiloxanes.

The use of the additives in accordance with my invention is especially adaptable for liquid organopolysiloxanes, for instance, the liquid alkyl-substituted polysiloxanes, e. g., liquid methyl-, ethyl-, propyl-, butyl-, isopropyl-substituted polysiloxanes, etc.; the liquid aryl-substituted polysiloxanes, e. g., the liquid phenyl-substituted polysiloaxanes, etc.; the liquid organopolysiloxanes containing different hydrocarbons substituted on the silicon atom or atoms, e. g., liquidmethyl- and phenyl-substituted polysiloxanes, etc., as well as liquid organopolysiloxanes containing both alkyl and aryl hydrocarbons substituted on different silicon atoms, e. g., liquid organopolysiloxanes obtained by hydrolyzing a mixture comprising substantially of dimethyl-dichlorosilane and diphenyl dichlorosilane. These additives are especially useful in increasing the lubricity of liquid organopolysiloxanes containing an average from about 1.9 to 3.0, e. g., from 1.9 to 2.5 hydrocarbon groups, especially 2.0 to 2.2 hydrocarbon groups per silicon atom.

What I claim as new and desire to secure by Letters Patent of the United States is:

1. A composition of matter comprising (1) a major proportion of a liquid organo-substituted polysiloxane and (2) from 0.5 to 10%, by weight, based on the weight of (1), of a lubricity additive comprising a compound corresponding to the general formula

where R is an alkyl radical containing from 1 to 4 carbon atoms, X is a halogen selected from the class consisting of chlorine, bromine, and fluorine, and $n$ is an integer equal to from 1 to 2, inclusive.

2. A composition of matter as in claim 1 wherein X is chlorine.

3. A composition of matter as in claim 1 wherein X is bromine.

4. A composition of matter as in claim 1 where R is the methyl radical.

5. A composition of matter comprising (1) a major proportion of a liquid hydrocarbon-substituted polysiloxane and (2) from 0.5 to 10%, by weight, based on the weight of (1), of a lubricity additive comprising a compound corresponding to the general formula

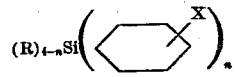

where R is an alkyl radical containing from 1 to 4 carbon atoms, X is a halogen selected from the class consisting of chlorine, bromine, and fluorine, and $n$ is an integer equal to from 1 to 2, inclusive.

6. A composition of matter comprising (1) a major proportion of a liquid methyl polysiloxane containing an average of from approximately 1.9 to 3.0 methyl groups per silicon atom and (2) from 0.5 to 10%, by weight, based on the weight of (1), of a lubricity additive comprising a compound corresponding to the general formula

where R is an alkyl radical containing from 1 to 4 carbon atoms, X is a halogen selected from the class consisting of chlorine, bromine, and fluorine, and $n$ is an integer equal to from 1 to 2 inclusive.

7. A composition of matter comprising (1) a major proportion of a liquid organo-substituted polysiloxane containing both methyl and phenyl radicals attached to the silicon atoms by C—Si linkages, and containing an average of from approximately 1.9 to 2.5 total methyl and phenyl groups per silicon atom and (2) from 0.5 to 10%, by weight, based on the weight of (1), of a lubricity additive comprising a compound corresponding to the general formula

where R is an alkyl radical containing from 1 to 4 carbon atoms, X is a halogen selected from the class consisting of chlorine, bromine, and fluorine, and $n$ is an integer equal to from 1 to 2, inclusive.

8. A lubricating composition comprising (1) a major proportion of a liquid methyl polysiloxane and (2) from 0.5 to 5 per cent, by weight, based on the weight of (1), of a lubricity additive comprising p-chlorophenyltrimethylsilane.

9. A lubricating composition comprising (1) a major proportion of a liquid methyl polysiloxane and (2) from 0.5 to 5 per cent, by weight, based on the weight of (1), of a lubricity additive comprising p-bromophenyltrimethylsilane.

10. A lubricating composition comprising (1) a major proportion of a liquid methyl polysiloxane and (2) from 0.5 to 5 per cent, by weight, based on the weight of (1) a lubricity additive comprising bis-p-chlorophenyldimethylsilane.

CHARLES A. BURKHARD.

REFERENCES CITED

The following references are of record in the file of this patent:

UNITED STATES PATENTS

| Number | Name | Date |
| --- | --- | --- |
| 2,426,121 | Rust | Aug. 19, 1947 |
| 2,467,178 | Zimmer et al. | Apr. 12, 1949 |
| 2,471,850 | Wilcock | May 31, 1949 |